C. R. P. GARDNER AND H. PARKER.
CASTER.
APPLICATION FILED MAY 26, 1921.

1,386,250.                              Patented Aug. 2, 1921.

INVENTORS:
Cyril R. P. Gardner
Harold Parker
By Wm. Wallace White
ATTY.

UNITED STATES PATENT OFFICE.

CYRIL ROBERT PRESTON GARDNER AND HAROLD PARKER, OF LONDON, ENGLAND.

CASTER.

1,386,250. Specification of Letters Patent. Patented Aug. 2, 1921.

Application filed May 26, 1921. Serial No. 472,648.

*To all whom it may concern:*

Be it known that we, CYRIL ROBERT PRESTON GARDNER, of 4 Melcombe Court, Dorset Square, N. W. 1, London, England, and HAROLD PARKER, of 26 Charing Cross road, London, England, both subjects of the King of Great Britain and Ireland, have invented certain new and useful Improvements in or Relating to Casters, of which the following is a specification.

This invention relates to casters of the type in which the casing or body is provided with an upper socket or other means by which it is secured to a leg of a table or chair and having a small socket to hold an antifriction ball and a lower or bottom socket to hold a caster ball; the lower edge of the bottom socket extending below the center of the ball and pressed inward to retain the ball in position.

In casters of this type as hitherto constructed the casing has been made in one piece and the edge of the bottom socket has been provided with transverse saw cuts to enable it to be pressed in to retain the caster ball.

The object of this invention is to provide an improved socket of this type.

According to this invention the casing is made from stampings in two parts, a hollow extension on one part passing through a hole in the other part and secured thereto by being turned over and pressed down, at the same time forming a seating for the small inner ball, the point of contact between the small ball and the cup thus formed being reduced to a minimum, the lower edge of the casing being bent inward to retain the caster ball.

The drawings filed herewith are sections of two forms of casters made in accordance with this invention.

Figure 1:
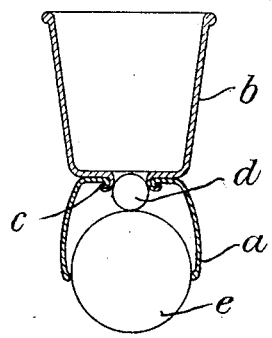

In Figure 1 $a$ is a socket member, $b$ the attachment member, $c$ an extension on one member which passes through a hole in the other member and is pressed down forming a seat for the antifriction ball $d$, the caster ball $e$ bears against the ball $d$ and held in position by the lower edge of the socket $a$ which is turned over.

Figure 2:
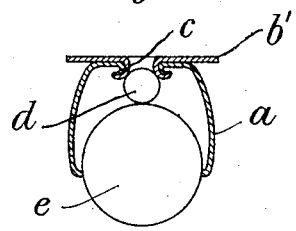

In Fig. 2 the attachment member $b'$ is in the form of a plate.

What we claim and desire to secure by Letters Patent is:—

A caster comprising a socket member and an attachment member, means for securing the attachment member and the socket member by an extension on the one passing through a hole in the other, said connection forming a ball seat, an antifriction ball adapted to rest on said seat and a caster ball adapted to bear on the antifriction ball and to be retained in said socket member.

In testimony whereof we have signed our names to this specification.

CYRIL ROBERT PRESTON GARDNER.
HAROLD PARKER.